United States Patent
Chen

(10) Patent No.: US 6,773,125 B2
(45) Date of Patent: Aug. 10, 2004

(54) HOUSING HAVING REFRACTIVE ILLUMINATION DEVICE

(75) Inventor: I Tao Chen, Hsin Chuang (TW)

(73) Assignee: Global Sun Technology Inc., Taipei (TW)

( * ) Notice: Subject to any disclaimer, the term of this patent is extended or adjusted under 35 U.S.C. 154(b) by 113 days.

(21) Appl. No.: 10/143,426

(22) Filed: May 7, 2002

(65) Prior Publication Data

US 2003/0210536 A1 Nov. 13, 2003

(51) Int. Cl.[7] .............................................. G01D 11/28
(52) U.S. Cl. ........................... 362/26; 362/551; 362/31; 362/558; 362/226; 362/326; 362/330; 362/368; 362/85; 362/27; 362/30
(58) Field of Search ............................. 362/26, 551, 31, 362/558, 226, 326, 330, 368, 85, 27, 30

(56) References Cited

U.S. PATENT DOCUMENTS

| | | | | |
|---|---|---|---|---|
| 5,319,527 A | * | 6/1994 | Murphy et al. ................ 362/26 |
| 5,938,324 A | * | 8/1999 | Salmon et al. ............... 362/555 |
| 5,988,842 A | * | 11/1999 | Johnsen et al. ............. 362/551 |
| 6,231,224 B1 | * | 5/2001 | Gamble et al. ............. 362/551 |
| 6,431,718 B1 | * | 8/2002 | Gamble et al. ................ 362/85 |

* cited by examiner

*Primary Examiner*—Stephen Husar
*Assistant Examiner*—Sharon Payne

(57) ABSTRACT

A housing for computer or the like includes a front wall, a refractive planer member attached to the housing and having a rib or a swelling engaged into the housing, and a light device disposed in the housing for generating light through the planer member and toward the rib and the swelling, and for allowing the light to be seen through the rib or the swelling. The rib has two curved ends for flushing with the curved sides of the housing. The planer member includes a curved recess formed in a bulge and facing toward the light device for receiving the light generated by the light device.

7 Claims, 4 Drawing Sheets

HOUSING HAVING REFRACTIVE ILLUMINATION DEVICE

BACKGROUND OF THE INVENTION

1. Field of the Invention

The present invention relates to a housing, and more particularly to a housing for attaching onto various kinds of objects, such as the computers, and having a refractive illumination device.

2. Description of the Prior Art

Typical objects, such as the computers, the mobile or portable phones, the printers, the monitors, the displayers, the note book type computers, or the other electric facilities may include a housing, and one or more circuit boards disposed in the housing and having one or more light bulbs or the like attached thereto. The housing may include one or more openings formed therein and aligned with the light bulbs, for allowing the light generated by the light bulbs to be emitted outward of the housing through the openings of the housing. However, it will be difficult to align the light bulbs with the openings in the housing when the circuit boards have been changed to the other ones, or when the light bulbs have been changed to the other locations relative to the circuit board and relative to the housing. In addition, one or more transparent blocks are secured into the openings of the housing and extended outward of the housing, and thus will be depressed inward of the housing and will be damaged inadvertently.

The present invention has arisen to mitigate and/or obviate the afore-described disadvantages of the conventional housings for electric objects or facilities.

SUMMARY OF THE INVENTION

The primary objective of the present invention is to provide a housing for attaching onto various kinds of objects, such as the computers, and having a refractive illumination device that will not be extended outward of the housing.

In accordance with one aspect of the invention, there is provided a housing comprising a housing body including a chamber formed therein, and including a front wall having a channel formed therein, a refractive illumination device including a planer body attached to the housing body, and including a longitudinal rib extended from the planer body and engaged into the channel of the housing body, for allowing the longitudinal rib to be exposed and seen from outside of the housing body, and a light device disposed in the housing for generating light through the planer body and toward the longitudinal rib of the refractive illumination device, and for allowing the light to be seen through the longitudinal rib.

The front wall of the housing body includes two curved sides, the longitudinal rib includes two ends having an outer curved shape corresponding to and flushing with the curved sides of the housing body.

The refractive illumination device includes a bar formed between the planer body and the longitudinal rib, and engaged with an inner surface of the front wall, for stably retaining the longitudinal rib in the channel of the housing body.

The housing body includes at least one catch extended therefrom and engaged with the longitudinal rib, for securing the longitudinal rib of the planer body in the housing body.

The planer body includes a curved recess formed therein, and facing toward the light device for receiving the light generated by the light device. The planer body includes a bulge extended therefrom and having the curved recess formed therein for facing toward the light device.

The housing body includes an orifice formed in the front wall thereof, the planer body includes a swelling extended therefrom and engaged into the orifice of the housing body for refracting the light generated by the light device.

The planer body includes an arm extended therefrom and having the swelling extended from the arm, the swelling includes an outer shape corresponding to and flushing with an outer shape of the housing body.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
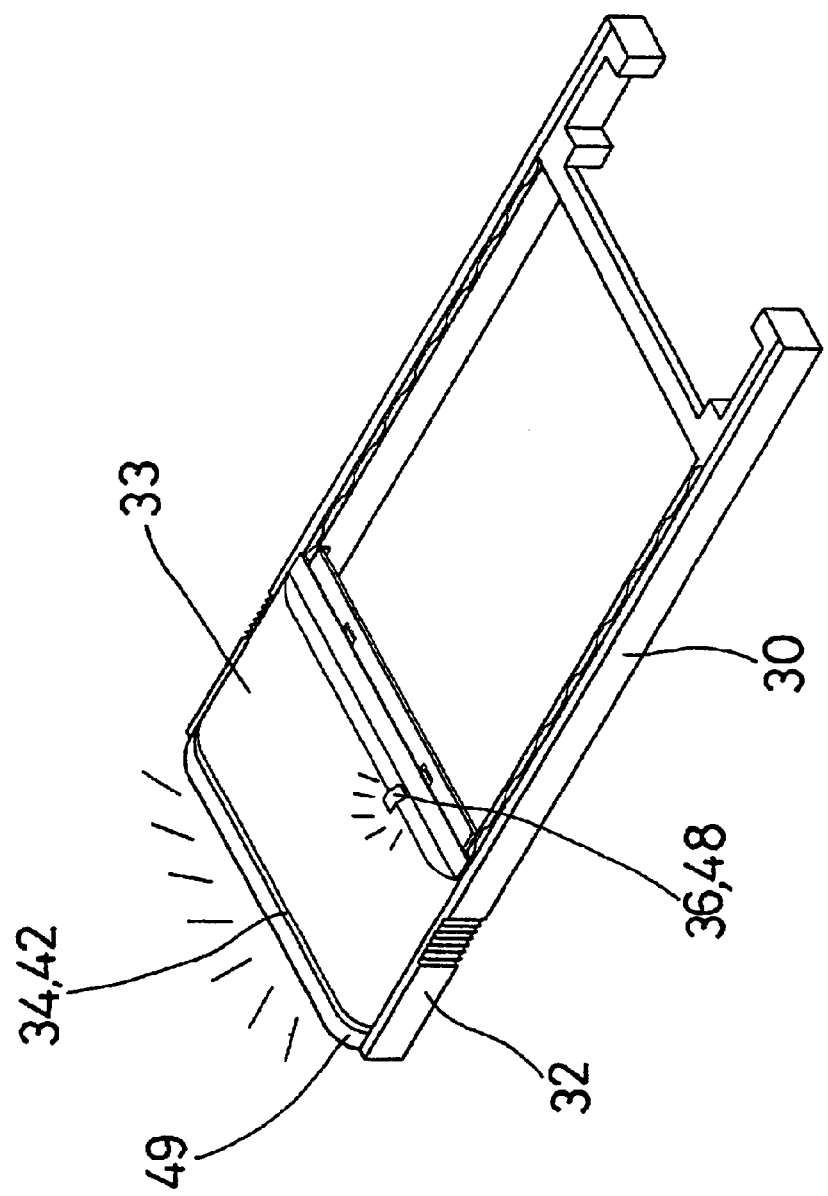
FIG. 1 is an upper perspective view of a housing in accordance with the present invention.
Figure 2:
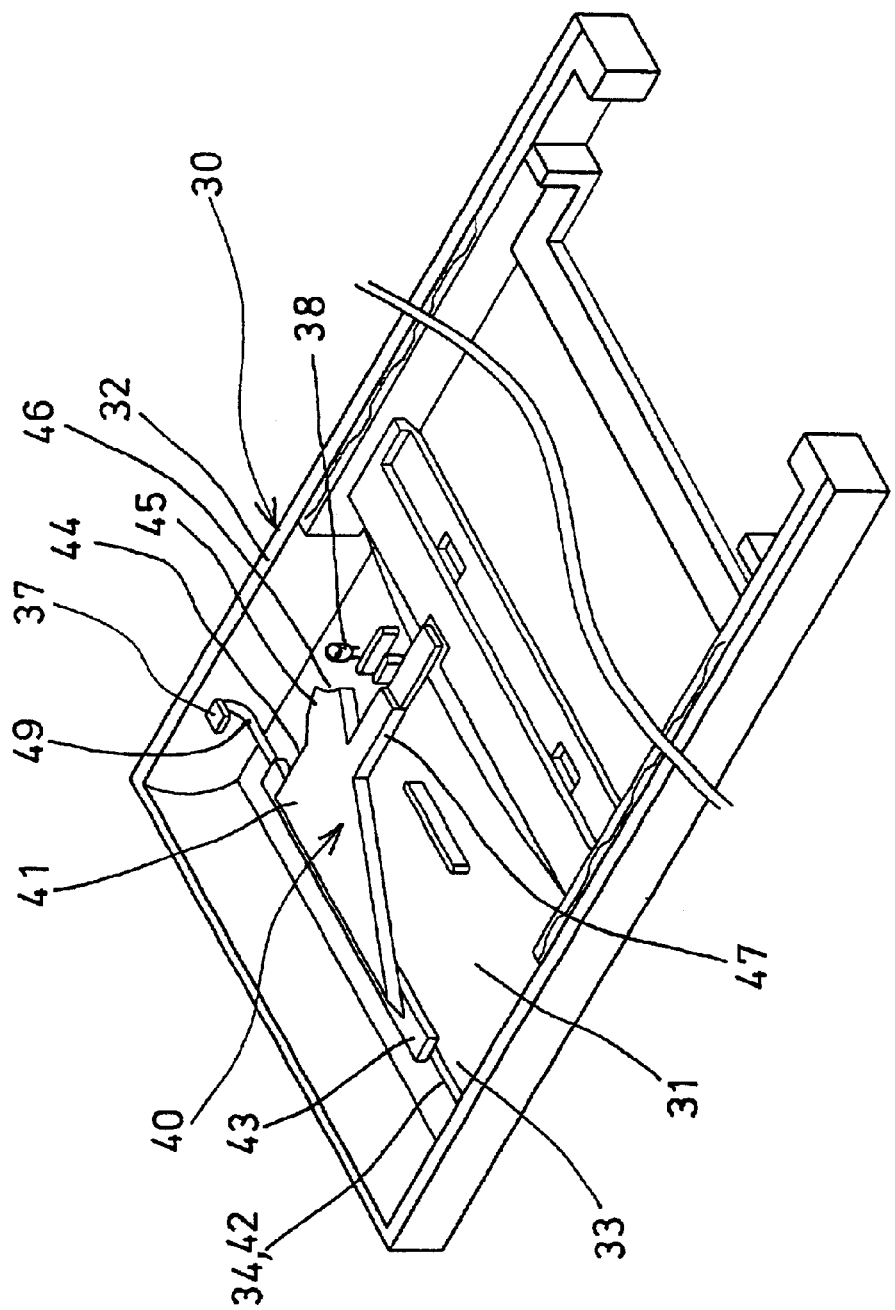
FIG. 2 is a bottom perspective view of the housing.
Figure 3:
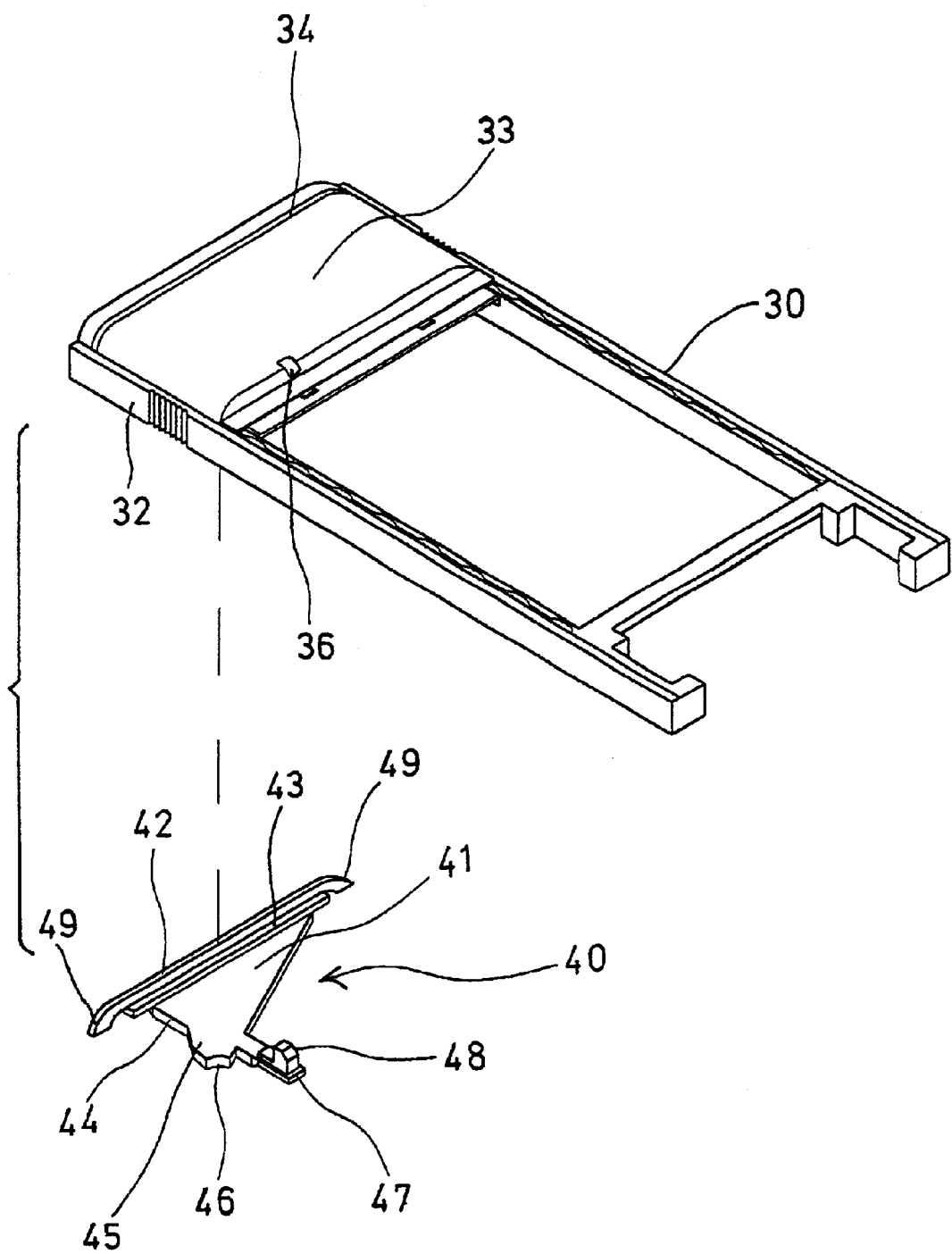
FIG. 3 is a partial exploded view of the housing.

Referring to the drawings, and initially to FIGS. 1–3, a housing in accordance with the present invention includes a housing body 30 provided for attaching onto various-kinds of objects, such as the computers, the mobile or portable phones, the printers, the monitors, the displayers, the note book type computers, or the other electric facilities. The housing body 30 comprises a chamber 31 formed therein (FIG. 2), and formed or defined by a peripheral wall 32, and a front wall 33. The housing body 30 includes a channel 34 and an orifice 36 formed therein, such as formed in the front wall 33 thereof, and communicating with the chamber 31 thereof.

Figure 4:
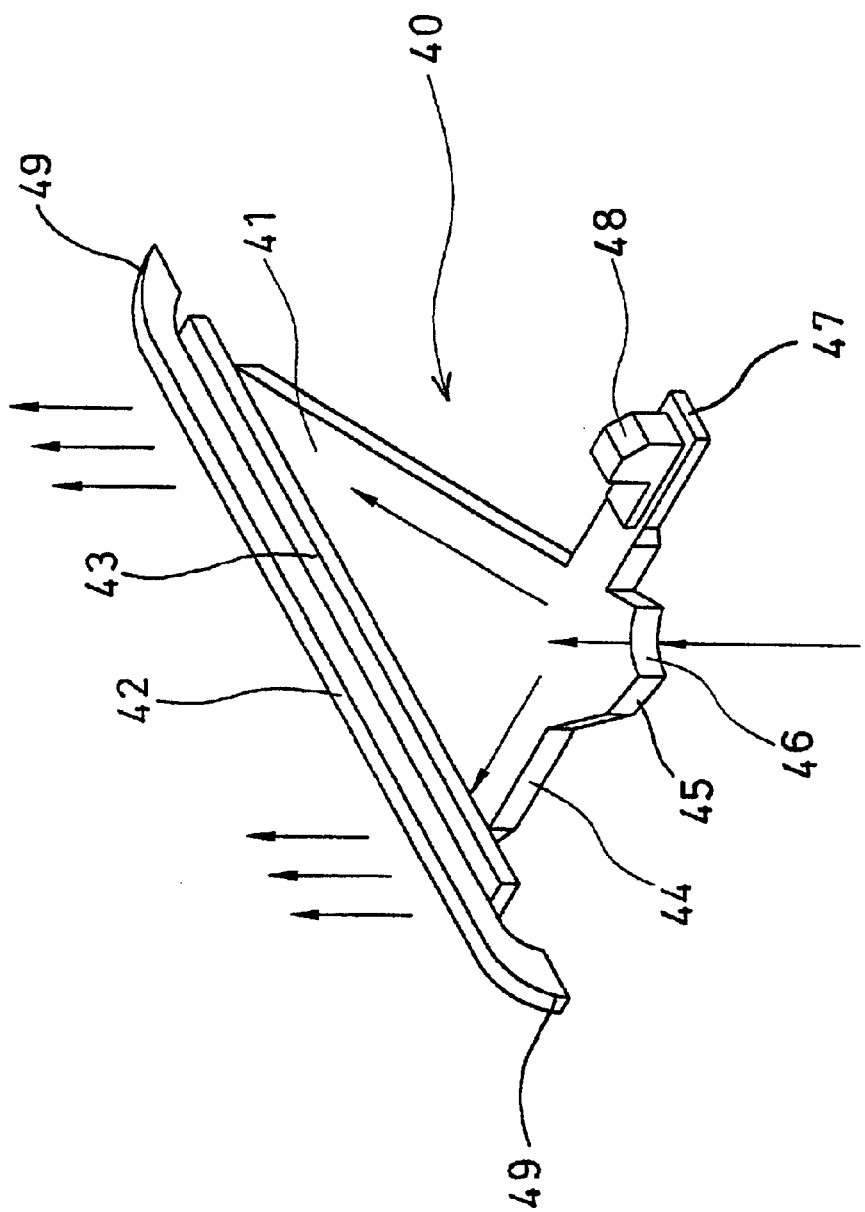
FIG. 4 is a perspective view illustrating a refractive member for the housing.

As shown in FIGS. 2–4, a refractive illumination device 40 includes a planer body 41 having a substantially triangular shape, and includes a longitudinal rib 42 extended from the planer body 41, such as extended from one side of the planer body 41, and perpendicular to the planer body 41 for engaging into the channel 34 of the housing body 30 and for allowing the longitudinal rib 42 to be exposed or to be seen from outside of the housing body 30. The longitudinal rib 42 preferably includes two curved ends 49 having the outer shape corresponding to and flush with the curved sides of the front wall 33 of the housing body 30, for allowing the longitudinal rib 42 and the front wall 33 of the housing body 30 to form a smooth outer surface, best shown in FIG. 1.

It is preferable that the refractive illumination device 40 further includes a presser bar 43 formed between the planer body 41 and the longitudinal rib 42, and engaged with the inner surface of the front wall 33 of the housing body 30, best shown in FIG. 2, for precisely engaging the longitudinal rib 42 in the channel 34 of the housing body 30, and for spacing the planer body 41 from the inner surface of the front wall 33. The housing body 30 may include one or more catches 37 (FIG. 2) extended from the peripheral wall 32 and extended inward of the chamber 31 of the housing body 30, for engaging with the ends 49 of the longitudinal rib 42, and for stably securing the planer body 41 to the housing body 30.

The refractive illumination device 40 further includes a bulge 45 extended from one side, such as the shortest side 44 of the planer body 41, and having a curved recess 46 formed therein and facing toward one or more light devices 38. The light devices 38 may be the light emitting diodes, the light bulbs, or the like, and may be electrically coupled to the circuit boards (not shown) of the housing body 30, for generating lights through the refractive illumination device 40. The refractive illumination device 40 further includes an arm 47 extended therefrom, such as extended from the longest side of the planer body 41, and having a swelling 48 extended therefrom for engaging into the orifice 36 of the housing body 30, and for allowing the swelling 48 to be exposed or to be seen from outside of the housing body 30.

It is preferable that the swelling 48 of the planer body 41 includes a shape corresponding to the outer shape of the front wall 33 of the housing body 30, for allowing the swelling 48 and the front wall 33 of the housing body 30 to form a smooth outer surface, best shown in FIG. 1. The refractive illumination device 40 is made of transparent or semi-transparent or refractive materials, and the planer body 41 and the longitudinal rib 42 and/or the presser bar 43, and the arm 47 and the swelling 48 are arranged for allowing the lights generated by the light device 38 to emit through the planer body 41 and the longitudinal rib 42 and/or the presser bar 43, and the arm 47 and the swelling 48 of the refractive illumination device 40 (FIGS. 1, 4).

In operation, as shown in FIG. 2, the longitudinal rib 42 of the refractive illumination device 40 may be engaged into the channel 34 of the housing body 30, and may be secured or locked to the housing 30 with the catches 37, and the swelling 48 of the refractive illumination device 40 may be engaged into the orifice 36 of the housing body 30, and may be secured or locked to the housing 30 with such as the force-fitted engagement, or with adhesive materials, or by the welding processes or the like. The curved recess 46 of the bulge 45 of the refractive illumination device 40 is disposed and faced toward the light devices 38 which may generate the lights through the planer body 41 and the longitudinal rib 42 and/or the presser bar 43, and the arm 47 and the swelling 48 of the refractive illumination device 40, and for allowing the refracted lights to be seen through the longitudinal rib 42 and the swelling 48. The refractive illumination device 40 may include only the longitudinal rib 42, or only the swelling 48 for refracting the lights.

Accordingly, the housing in accordance with the present invention includes a refractive illumination device that will not be extended outward of the housing, and that includes a longitudinal rib and a swelling flushing with the outer surface of the housing.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A housing comprising:
   a housing body including a chamber formed therein, and including a front wall having a channel formed therein, said front wall of said housing body including two curved sides,
   a refractive illumination device including a planer body attached to said housing body, and including a longitudinal rib extended from said planer body and engaged into said channel of said housing body, for allowing said longitudinal rib to be exposed and seen from outside of said housing body, said longitudinal rib including two ends having an outer curved shape corresponding to and flushing with said curved sides of said housing body, and
   a light device disposed in said housing for generating light through said planer body and toward said longitudinal rib of said refractive illumination device, and for allowing the light to be seen through said longitudinal rib.

2. A housing comprising:
   a housing body including a chamber formed therein, and including a front wall having a channel formed therein,
   a refractive illumination device including a planer body attached to said housing body, and including a longitudinal rib extended from said planer body and engaged into said channel of said housing body, for allowing said longitudinal rib to be exposed and seen from outside of said housing body, and said refractive illumination device including a bar formed between said planer body and said longitudinal rib, and engaged with an inner surface of said front wall, for stably retaining said longitudinal rib in said channel of said housing body, and
   a light device disposed in said housing for generating light through said planer body and toward said longitudinal rib of said refractive illumination device, and for allowing the light to be seen through said longitudinal rib.

3. A housing comprising:
   a housing body including a chamber formed therein, and including a front wall having a channel formed therein,
   a refractive illumination device including a planer body attached to said housing body and including a longitudinal rib extended from said planer body and engaged into said channel of said housing body, for allowing said longitudinal rib to be exposed and seen from outside of said housing body,
   a light device disposed in said housing for generating light through said planer body and toward said longitudinal rib of said refractive illumination device, and for allowing the light to be seen through said longitudinal rib, and
   said housing body including at least one catch extended therefrom and engaged with said longitudinal rib, for securing said longitudinal rib of said planer body in said housing body.

4. The according to claim 1, wherein said planer body includes a curved recess formed therein, and facing toward said light device for receiving the light generated by said light device.

5. A housing comprising:
   a housing body including a chamber formed therein, and including a front wall having a channel formed therein,
   a refractive illumination device including a planer body attached to said housing body, and including a longitudinal rib extended from said planer body and engaged into said channel of said housing body, for allowing said longitudinal rib to be exposed and seen from outside of said housing body,
   a light device disposed in said housing for generating light through said planer body and toward said longitudinal rib of said refractive illumination device, and for allowing the light to be seen through said longitudinal rib, and
   said planer body including a curved recess formed therein, and facing toward said light device for receiving the light generated by said light device, and said planer body including a bulge extended therefrom and having said curved recess formed therein for facing toward said light device.

6. A housing comprising:

a housing body including a chamber formed therein, and including a front wall having a channel formed therein, and said housing body including an orifice formed in said front wall thereof, a refractive illumination device including a planer body attached to said housing body, and including a longitudinal rib extended from said planer body and engaged into said channel of said housing body, for allowing said longitudinal rib to be exposed and seen from outside of said housing body, a light device disposed in said housing for generating light through said planer body and toward said longitudinal rib of said refractive illumination device, and for allowing the light to be seen through said longitudinal rib, and said planer body including a swelling extended therefrom and engaged into said orifice of said housing body for refracting the light generated by said light device.

7. The according to claim 6, wherein said planer body includes an arm extended therefrom and having said swelling extended from said arm, said swelling includes an outer shape corresponding to and flushing with an outer shape of said housing body.

* * * * *